United States Patent [19]

Mizuno et al.

[11] Patent Number: 4,965,500
[45] Date of Patent: Oct. 23, 1990

[54] INDUSTRIAL ROBOT CONTROL APPARATUS

[75] Inventors: Toru Mizuno, Tama; Ryuichi Hara; Hiroji Nishi, Yamanashi, all of Japan

[73] Assignee: Fanuc Ltd., Yamanashi, Japan

[21] Appl. No.: 350,471

[22] PCT Filed: Jun. 20, 1988

[86] PCT No.: PCT/JP88/00611
§ 371 Date: Feb. 17, 1989
§ 102(e) Date: Feb. 17, 1989

[87] PCT Pub. No.: WO88/10453
PCT Pub. Date: Dec. 29, 1988

[30] Foreign Application Priority Data
Jun. 19, 1987 [JP] Japan ............................ 62-151422

[51] Int. Cl.$^5$ ............................................ G05B 19/42
[52] U.S. Cl. ............................ 318/568.13; 318/588.1; 318/567; 364/513; 364/191; 364/200; 901/3
[58] Field of Search ......................... 318/560–648; 364/474.31, 513, 200; 901/3, 6, 7, 8, 9, 13, 14–23

[56] References Cited
U.S. PATENT DOCUMENTS

| | | | |
|---|---|---|---|
| 4,141,067 | 2/1979 | McLagan | 364/200 |
| 4,308,584 | 12/1981 | Arai | 901/3 X |
| 4,445,184 | 4/1984 | Noguchi | 364/191 X |
| 4,467,436 | 8/1984 | Chance et al. | 364/513 |
| 4,517,653 | 5/1985 | Tsuchihashi et al. | 364/513 |
| 4,602,345 | 7/1986 | Yokoyama | 364/513 |
| 4,617,502 | 10/1986 | Sakaue et al. | 318/568.19 X |
| 4,633,414 | 12/1986 | Yabe et al. | 901/9 X |
| 4,689,756 | 8/1987 | Koyama et al. | 364/474.31 X |
| 4,694,232 | 9/1987 | Suzuki et al. | 318/568.13 |
| 4,698,777 | 10/1987 | Toyoda et al. | 364/474.31 |
| 4,841,210 | 6/1989 | Kato | 364/513 X |

FOREIGN PATENT DOCUMENTS 57-203144 12/1982 Japan.
60-218113 10/1985 Japan.

*Primary Examiner*—William M. Shoop, Jr.
*Assistant Examiner*—Paul Ip
*Attorney, Agent, or Firm*—Armstrong, Nikaido, Marmelstein, Kubovcik & Murray

[57] ABSTRACT

An apparatus for controlling an industrial robot in a shared manner using a plurality of operation controllers so that the robot automatically works under the optimum load condition. When power is turned on, the operation controllers (5) to (7) connected via a common bus (1) operate their own respective initial loaders to read control data (TCB) from an external memory (3) into their own respective memories (RAM) and any one of the operation controllers (5) to (7) loads the control data (TCB) and synchronization control data in a shared memory (4). When synchronized with each other, the operation controllers (5) to (7) load the tasks from the external memory (3) in their own memories (RAM), depending upon their capabilities determined by the control data (TCB) and upon their shares of the task. Therefore, the industrial robot is controlled in a shared manner depending upon the task that is loaded.

2 Claims, 3 Drawing Sheets

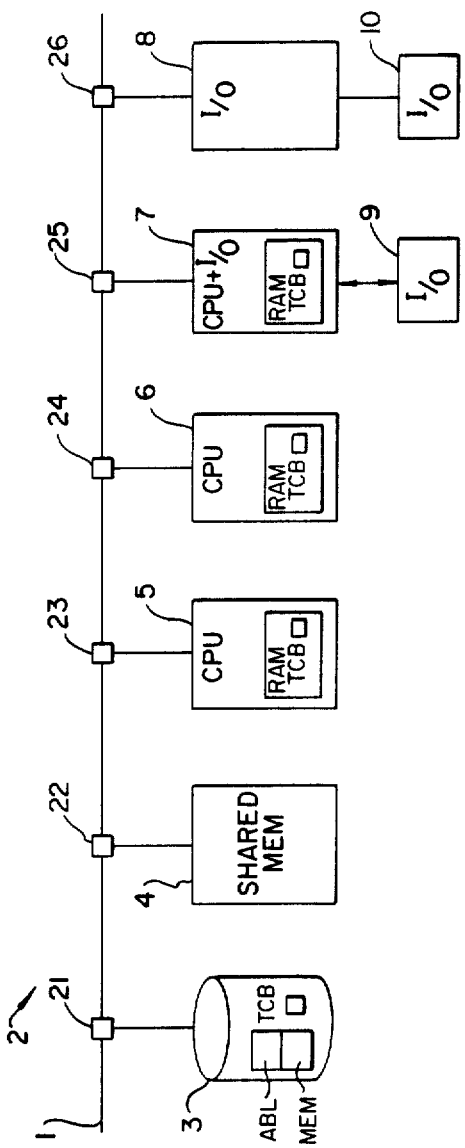

INDUSTRIAL ROBOT CONTROL APPARATUS

DESCRIPTION

1. Technical Field

The present invention relates to a control apparatus for an industrial robot, and more particularly, to a technique of loading a plurality of tasks into a plurality of arithmetic and control units in an initialization period when control of the industrial robot is shared by the arithmetic and control units.

2. Background Art

The control of an industrial robot has become more sophisticated and complex, and a demand has arisen for a high-performance control apparatus. But, instead of using such a high-performance control apparatus, a technique of using a plurality of arithmetic and control units, e.g., microcomputers, and sharing the control of an industrial robot, is occasionally adopted. Namely, by using a plurality of microcomputers each having a relatively low performance and distributing the overall tasks, the overall processing ability is improved to an extent such that complex control of the industrial robot can be satisfactorily performed. The number of microcomputers to be used is determined by the amount of control needed for the industrial robot, the processing ability of each microcomputer, the cost of the control apparatus, and the like.

Each microcomputer comprises a CPU, a RAM, and a ROM, and one of the microcomputers further comprises an I/O unit to enable an interface with a mechanical section, a drive section, a sensor section, and the like, of the industrial robot. These microcomputers can be interlinked through a bus.

An external storage unit, e.g., a magnetic disk unit, is connected to the microcomputers through the bus, and stores the various tasks to be executed in each microcomputer and an operating system (OS) for executing these tasks. In an initialization period immediately after a power source is turned ON, and OS is loaded in each RAM by an initial loader, e.g., a bootstrap loader, in each microcomputer, and then tasks are loaded in each RAM in accordance with a predetermined task assignment. As described above, the OS and the tasks are previously stored in the magnetic disk unit, and the OS and a corresponding task are loaded in the RAM of each microcomputer during the initialization period, for the following reasons. Assuming that the OS and the corresponding task are fixed in each microcomputer, then they must be stored in, e.g., a ROM, to be retained after the power source is turned OFF. But, to allow this storing in the ROM, first the ROM must have a large capacity, thereby posing a problem in terms of cost, and second, although the contents of a task are often changed, such changes cannot be effectively processed. Therefore, the ROMs can be replaced by a simple non-volatile memory such as a floppy disk, in which an OS and a task of a given microcomputer are store, connected to each microcomputer, and the stored OS and task loaded from the floppy disk into each RAM during the initialization period. In this method, however, floppy disks are required for a plurality of microprocessors, and thus the overall cost is inevitably increased. Accordingly, a magnetic disk unit is commonly connected to all of the microcomputers, and the initial loading of each RAM is performed during the initialization period as described above.

A common memory, e.g., a shared memory, is also connected to the bus. In the above system wherein a plurality of microcomputers are connected on the same level without a supervisory computer, to thereby constitute a non-hierarchical structure, when the processing of tasks in the microcomputers is to be synchronized, this synchronization is established by, e.g., a mailbox scheme or a semaphore technique, by using this shared memory.

As described above, in the conventional system, the assignment of programs (tasks) to be executed by the respective microcomputers is determined when the programs are prepared, but this task assignment is not always easy. An excessive load may be applied to one microprocessor but relatively small loads applied to the other microprocessors, and in this case, the microprocessor to which the excessive load is applied becomes a bottleneck, and thus the overall control of the industrial robot is adversely affected. Therefore, a uniform load assignment must be realized in an adjustment stage, but this adjustment is time-consuming.

Due to the changes of or additions to the contents of the control of the industrial robot, the number of microcomputers must be correspondingly increased or decreased. Due to recent advances in hardware technology, this operation can be performed from the viewpoint of hardware by simply inserting of withdrawing microcomputer modules in and from corresponding slots. From the viewpoint of software, however, the program assignment must be completely changed. Furthermore, in most cases, such an operation must be quickly and safely performed on industrial robots in site, but as described above, this task assignment is made on a trial-and-error basis, and thus a long time is required for the adjustment.

Therefore, desirably the control contents of an industrial robot are optimally assigned to a plurality of arithmetic and control units within a short time and without unnecessary labor.

DISCLOSURE OF THE INVENTION

An object of the present invention is to provide an industrial robot control apparatus in which control contents for controlling an industrial robot and a load thereof are automatically and optimally distributed in response to an ability of a plurality of processors, and which, under this load distribution, enables a shared control of the industrial robot. According to the present invention, there is provided an industrial robot control apparatus for share-controlling an industrial robot, comprising a plurality of arithmetic and control units connected to each other through a common bus and sharing the control of the industrial robot, characterized in that the apparatus comprises an external storage unit connected to said plurality of arithmetic and control units through the common bus, for storing an operating system and a plurality of tasks operated in each of the arithmetic and control units, management data for assigning tasks to the plurality of arithmetic and control units, and synchronization control data, and a shared memory connected to the plurality of arithmetic and control units and the external storage unit through the common bus, at a start-up of the industrial robot control apparatus, each of the plurality of arithmetic and control units loads management data stored in the external storage unit into an own memory by using an initial loader operated in response to an energization of a power source, a specified unit of the plurality of arithmetic and control units loads management data and synchronization control data from the external storage unit into the shared memory, each of the plurality of arithmetic and control units loads the operating system from the external storage unit into the own memory while establishing a synchronization with other arithmetic and control units in accordance with synchronization control data stored in the shared memory, each of the plurality of arithmetic and control units sequentially loads a corresponding task from the external storage unit into the own memory in accordance with a processing ability and a task load of the arithmetic and control unit defined by the management data while establishing synchronization with other arithmetic and control units in accordance with the synchronization control data stored in the shared memory, and after the tasks are loaded, the plurality of arithmetic and control units share control of the industrial robot by using the loaded tasks while establishing a synchronization with each other.

Namely, the tasks to be shared at the arithmetic and control units are automatically determined by management data, and to prevent competition for the tasks among the arithmetic and control units, a synchronization thereof is established by using the shared memory.

Upon completion of the loading of the tasks, each of the arithmetic and control units carries out the control operation of the loaded tasks without a data transmission to and a data reception from the external storage unit.

In addition, each of the plurality of arithmetic and control units is constructed to check whether or not a capability of accepting the load of the corresponding tasks into the own memory is available when the corresponding tasks are loaded from the external storage unit to the own memory, and to carry out the loading only when the load can be accepted, and a memory size of the load is subtracted from a memory size of the management data.

BRIEF DESCRIPTION OF THE DRAWINGS

FIG. 1 is a block diagram showing an arrangement of an industrial robot control apparatus according to an embodiment of the present invention;

FIG. 2 is a view showing a task control block in FIG. 1; and

BEST MODE OF CARRYING OUT THE INVENTION

Figure 3:
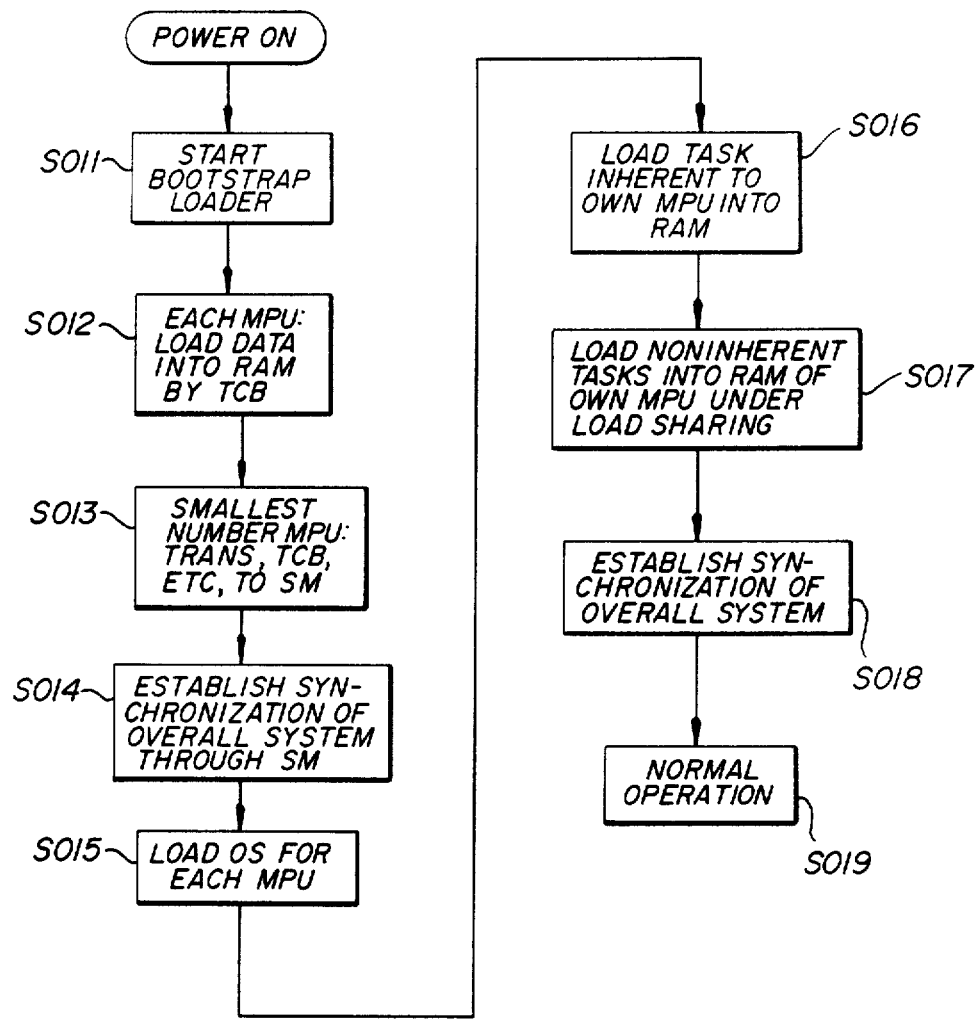
FIGS. 3 and 4 are flow charts for explaining the task loading in FIG. 1.

FIG. 1 shows an arrangement of an industrial robot control apparatus.

The apparatus comprises an external storage unit, e.g., a magnetic disk unit 3, a shared memory 4, microcomputers 5 to 7, and an I/O board 8, all of which are connected to a common bus 1 through bus connectors 21 to 26, respectively. The external storage unit 3 stores a task control block (TCB) as management data for task assignment and synchronization data, in addition to an operating system (OS) to be loaded in the microcomputers 5 to 7 and tasks to be assigned to these microcomputers. Each of the microcomputers 5 to 7 has a CPU (MPU), a RAM, and a ROM. The microcomputer 7 has an I/O function, and the microcomputers 5 and 6 do not have an I/O function, and an I/O interface 9 is connected to the microcomputer 7 having the I/O function. An I/O interface 10 is connected to the I/O board 8. The control apparatus is connected to a sensor section and a drive section (neither of which are shown) of the industrial robot through the interface 9 and 10, to thereby directly control the industrial robot. Note, that such an operation is not directly associated with the present invention, and thus a description thereof will be omitted.

A program for controlling the industrial robot is called a task. Tasks are formed in units of programs, and are completely independent from, and thus do not interfere with, each other. When a control operation is to be performed, however, a matching of timing, synchronization, data communication, and the like must be performed, and such operations are carried out by a semaphore or mailbox scheme.

Tasks are classified into basic tasks required for all of the microcomputers and optional tasks not required for all of the microcomputers. The optional tasks are classified into a task assigned to the microcomputer 7 having the I/O function and unassigned tasks which can be executed in any microcomputer. Each task has a predetermined load (LOAD),.and the data of each task is stored in the magnetic disk unit 3 as a TCB, as shown in FIG. 2. Referring to FIG. 2, a task 1 (T1) is an inherent task to be executed in the microcomputer 7, and has a load of 10 and requires a memory capacity of 4 KB. Tasks 2 and 3 (T2, T3) are assigned tasks and have loads of 5 and 3 and require memory capacities of 2 KB and 1.5 KB, respectively.

A relative address is assigned to each task so that the task can be written to any address of a RAM in any microcomputer. In addition, an address translation function is provided at the microcomputer side.

The magnetic disk unit 3 stores an ability table (ABL), as other management data representing the processing ability of each microcomputer. For example, the processing abilities of the microcomputers are respectively set to be ABL(5)=200, ABL(6)=200, and ABL(7)=300. The total of these abilities, i.e., 700, must be larger than the sum total of the loads of the tasks. The magnetic disk unit 3 stores, as other management data, an OS of the RAM in each microcomputer and a memory table (MEM) for storing a memory capacity of each RAM. For example, the memory capacities of the RAM's of the microcomputers 5 to 7 are respectively set to be MEM(5)=64 KB, MEM(6)=64 KB, and MEM(7) =128 KB, and the total of these capacities must be larger than the total of the memory capacities required by all the tasks.

An initial loader constituted by a hardware circuit, called a bootstrap loader, is incorporated in each microcomputer. Each initial loader is driven by an interruption when the power source is turned ON, and performs the loading of tasks and the like in the following manner.

The loading of tasks and the like will be described below with reference to FIG. 3.

Step 011 (S011)

When the power source i turned ON, the bootstrap loaders of the respective microcomputers are started.

Step 012 (S012)

Each bootstrap loader loads data constituting the TCB from the magnetic disk unit 3 into the last portion of the corresponding RAM. Loading is performed by designating the addresses and capacities of the TCB in the magnetic disk unit 3 through the bus connectors 23 to 25 and the bus 1, and read-accessing the TCB. In this case, the start address and the transfer capacity of the TCB are fixed, and this data is set in the bootstrap loaders.

Step 013 (S013)

Subsequently, the bootstrap loader of a specified one of the microcomputers 5 to 7 (in this embodiment, the microcomputer 5 represented by the smallest reference numeral) transfers the contents of the TCB, the ability table ABL, and the memory table MEM as management data, and synchronization data from the magnetic disk unit 3, into the shared memory 4. The data transferred to the shared memory 4 is commonly used as control data for the initial loading in the respective microcomputers, as will be described below.

Step 014 (S014)

The bootstrap loaders of the microcomputers 5 to 7 set corresponding flags as synchronization data in the shared memory 4. When the corresponding flags are set by the respective microcomputers, a system synchronization is established prior to the following loading operation.

Step 015 (S015)

The microcomputers 5 to 7 sequentially transfer their own OS's from the magnetic disk unit 3 to their own RAM's. In this embodiment, the microcomputers 5 and 6 load an identical OS having no I/O function in the corresponding RAMs, whereas the microcomputer 7 loads an OS having an I/O function in the RAM. The completion of loading of the OS in each microcomputer can be identified by other microcomputers by setting the corresponding flags in the shared memory 4. Each microcomputer updates its memory capacity, to allow loading, by subtracting the memory capacity of the OS from the memory capacity stored in the memory table MEM.

Step 016 (S016)

Subsequently, the loading of tasks is started. First, assigned tasks are loaded in corresponding microcomputers. In this embodiment, only the microcomputer 7 sequentially loads assigned tasks associated with I/O processing, such as tasks T1 and T100 shown in FIG. 2, into its own RAM. In this case, the bootstrap loader of the microcomputer 7 loads the task T1 into the RAM, and at the same time, subtracts 10 from its own ability data of the ability table ABL in the shared memory 4 and subtracts 4-KB data from its own memory data in the memory table MEM. The task T100 is processed in the same manner. With this operation, the margin of ability and the memory capacity of the microcomputer 7 are updated.

If, however, assigned tasks must be loaded into a plurality of microcomputers, the above processing is performed such that synchronization data in the shared memory 4 is checked for every loading operation of a task, to prevent competition.

Step 017 (S017)

Figure 4:
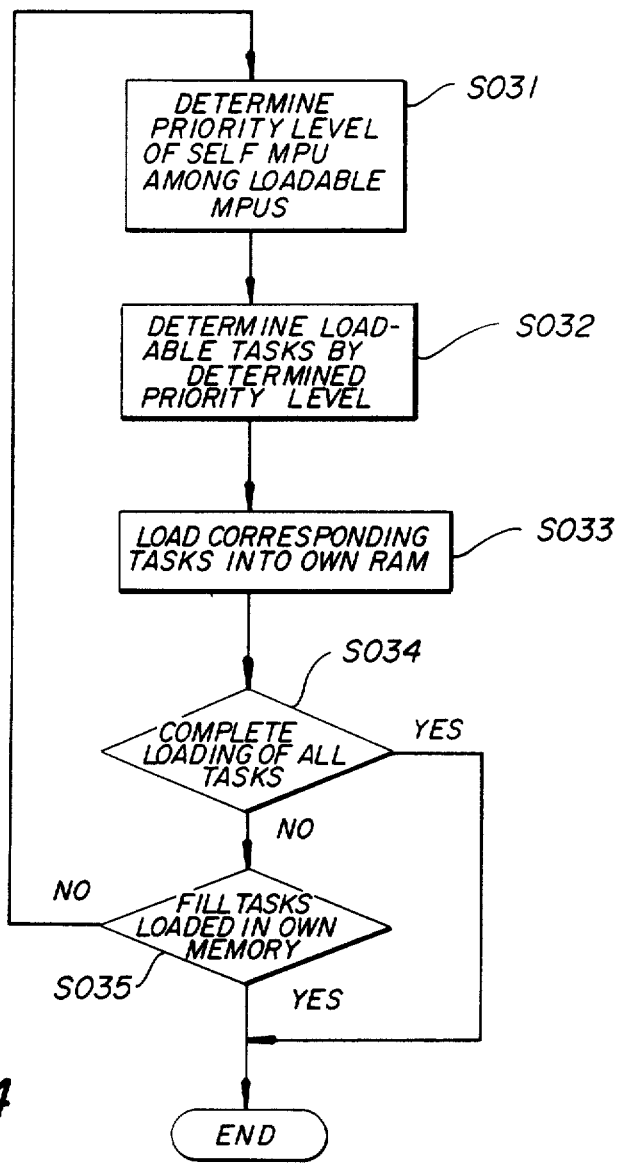

When all the assigned tasks are loaded, each microcomputer checks the synchronization data in the shared memory 4, and starts loading unassigned tasks. This loading is performed while a proper assignment of loads is performed. This operation will be described in detail below with reference to a flow chart in FIG. 4.

Step 031 (S031)

With respect to the tasks to be loaded, each microcomputer determines its own priority levels on the basis of the margin of its ability and memory capacity allowing data loading. If identical priority levels are assigned to two microcomputers, a microcomputer represented by a smaller reference numeral is given priority for the task.

Steps 032, 033, (S032, S033)

The bootstrap loader of each microcomputer determines tasks which can be loaded, on the basis of the determined priority level (S032), and loads the tasks in its own RAM (S033). Together with this loading, as described above, the contents of the ability table ABL and the memory capacities allowing data loading stored in the shared memory 4 are updated. In addition, flags representing that the loading of the corresponding tasks is completed are set.

Steps 034, 035 (S034, S035)

The above-described loading operation of the inherent tasks is continued until the loading of all of the tasks is completed (S034). When, however, a microcomputer determines from its ability and memory capacity allowing data loading that it is filled with a load to be shared, the microcomputer ends the above loading operation. This loading operation is ended by setting a flag in the shared memory 4.

Steps 018, 019 (S018, S019)

When the loading of all the unassigned tasks is completed, synchronization of the overall system is established (S018 in FIG. 3), and a normal control operation is started (S019). The end of loading of all the unassigned tasks is determined by a microcomputer which performs the last loading. The microcomputer which performs the last loading sets a flag representing that each microcomputer can perform a normal operation in the shared memory 4 so that the synchronization operation of the system (S018) and the control operation (S019) can be performed.

If the total ability of all of the microcomputers is smaller than the total load of all of the tasks, or the total RAM capacity of all of the microcomputers is smaller than the total memory capacity of all of the tasks and OSs, the microcomputer which performs the last loading performs an error display upon detection of the above state.

In the above embodiment, the microcomputers are used as a control apparatus, but the present invention can be applied to a case wherein other units similar to the microcomputers, e.g., microprocessors and minicomputers, are used.

As described above, according to the present invention, an optimal load assignment corresponding to the total ability of overall arithmetic and control units can be realized on the basis of the contents of a task control block uniquely determined by the contents of tasks and the ability of each arithmetic and control unit. Since this load assignment is automatically performed by the control apparatus side, the labor usually necessary for this operation can be reduced.

We claim:

1. An industrial robot control apparatus for share-controlling an industrial robot, comprising:

a plurality of arithmetic and control units connected to each other through a common bus and for sharing control of the industrial robot, each of said arithmetic and control units having a volatile memory;

an external storage unit, connected to said plurality of arithmetic and control units through said common bus, for storing an plurality of assigned operating systems and a plurality of assigned tasks which are assigned to each said arithmetic and control units, for storing a plurality of unassigned tasks which can be operated in any of said arithmetic and control units, for storing management data which defines memory capabilities of said plurality of arithmetic and control units and which loads said assigned and unassigned tasks, and for storing synchronization control data which indicates which arithmetic and control units stores said tasks; and a shared memory connected to said plurality of arithmetic and control units and said external storage unit through said common bus, each of said plurality of arithmetic and control units loading said management data stored in said external storage unit into its own volatile memory by using an initial loader operated in response to an energization of a power source, a specified one of said plurality of arithmetic and control units loading said management data and synchronization control data from said external storage unit into said shared memory, each of said plurality of arithmetic and control units loading one of said assigned operating systems and some of said assigned tasks thereto into its own volatile memory while establishing a synchronization with other arithmetic and control units in accordance with synchronization control data stored in said shared memory;

each of said plurality of arithmetic and control units sequentially loading some of said unassigned tasks from said external storage unit into its own volatile memory in accordance with processing capabilities and load of said unassigned tasks defined by the management data while establishing synchronization with other arithmetic and control units in accordance with the synchronization control data stored in said shared memory, therein controlling the industrial robot under a shared control of said arithmetic and control units by establishing a synchronization with each other.

2. An industrial robot control apparatus according to claim 1, wherein each of said plurality of arithmetic and control units determines whether or not the memory capability of its own volatile memory can accept the load of said unassigned tasks in accordance with said management data stored therein, therein loading said unassigned tasks into said own volatile memory when the memory capability thereof can accept the load of said unassigned tasks, so that the load of said loaded unassigned tasks is subtracted from its own memory capability.

* * * * *